US008952940B2

(12) United States Patent
Nakatani et al.

(10) Patent No.: US 8,952,940 B2
(45) Date of Patent: Feb. 10, 2015

(54) CAPACITY LOAD DRIVE DEVICE AND LIQUID CRYSTAL DISPLAY DEVICE USING THE SAME

(75) Inventors: Yoshiyuki Nakatani, Osaka (JP); Takayuki Nakashima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1063 days.

(21) Appl. No.: 12/682,089

(22) PCT Filed: Oct. 10, 2008

(86) PCT No.: PCT/JP2008/068455
§ 371 (c)(1), (2), (4) Date: Apr. 8, 2010

(87) PCT Pub. No.: WO2009/048136
PCT Pub. Date: Apr. 16, 2009

(65) Prior Publication Data
US 2010/0259513 A1 Oct. 14, 2010

(30) Foreign Application Priority Data
Oct. 10, 2007 (JP) ................................ 2007-264030

(51) Int. Cl.
*G06F 3/038* (2013.01)
*G09G 3/36* (2006.01)

(52) U.S. Cl.
CPC ............ *G09G 3/3622* (2013.01); *G09G 3/3692* (2013.01)
USPC ............................................ 345/204; 345/87

(58) Field of Classification Search
CPC G09G 2310/06; G09G 3/3677; G09G 3/3692
USPC .................................................. 345/87, 204
See application file for complete search history.

(56) References Cited

U.S. PATENT DOCUMENTS

2009/0140779 A1 * 6/2009 Maruo ........................ 327/111

FOREIGN PATENT DOCUMENTS

| | | |
|---|---|---|
| JP | 05-127622 | 5/1993 |
| JP | 09-102592 | 4/1997 |
| JP | 10-207429 | 8/1998 |
| JP | 2007-052087 | 3/2007 |
| JP | 2007-086280 | 4/2007 |
| WO | WO 2006/075768 | 7/2006 |

* cited by examiner

*Primary Examiner* — Amare Mengistu
*Assistant Examiner* — Sarvesh J Nadkarni
(74) *Attorney, Agent, or Firm* — Fish & Richardson P.C.

(57) ABSTRACT

A capacity load drive device 1 includes: a logic portion 11 generating a binary logic signal IN; and a driver portion 13 determining, based on a predetermined mode switching signal MODE, whether to generate a binary drive signal or ternary drive signal from the logic signal IN and applying binary or ternary drive signals X1 to Xm generated according to the determination, to an end of a capacity load (liquid crystal cell).

5 Claims, 8 Drawing Sheets

| MODE | IN1 | D1 | SW1 | | | X1 |
|---|---|---|---|---|---|---|
| | | | S11 | S21 | S31 | |
| H | H | H | ON | OFF | OFF | VH |
| | H | L | OFF | OFF | ON | VC |
| | L | H | OFF | OFF | ON | VC |
| | L | L | OFF | ON | OFF | VL |
| L | H | * | ON | OFF | OFF | VH |
| | L | * | OFF | ON | OFF | VL |

CAPACITY LOAD DRIVE DEVICE AND LIQUID CRYSTAL DISPLAY DEVICE USING THE SAME

TECHNICAL FIELD

The present invention relates to a capacity load drive device that drives a capacity load (for example, a liquid crystal cell), and to a liquid crystal display device employing the capacity load drive device.

BACKGROUND ART

Conventionally, as a drive system of a capacity load (for example, a liquid crystal cell), there has been known, in addition to a binary drive system (see FIG. 9A)—in which the voltage level of a drive voltage that is applied to one end of a capacity load is switched from a high level (a first voltage VH) to a low level (a second voltage VL) directly or from the low level to the high level directly—, a ternary drive system (a VC drive system) in which an intermediate level (a third voltage VC) is gone through in switching of the voltage level of the drive voltage (see FIG. 9B).

An example of a conventional art related to the above is disclosed in Patent Document 1 disclosed by the applicant of this application.

Patent Document 1: International Publication WO-2006-075768

DISCLOSURE OF THE INVENTION

Problems to be Solved by the Invention

Adopting the above-described conventional ternary drive system indeed permits reduction of power consumption in driving an electronic device (for example, a liquid crystal display device) that is provided with a capacity load.

The above-described conventional ternary drive system, however, is realized by generating a ternary signal that corresponds to an input signal (for example, a video signal) by a logic portion, and outputting it to a driver portion; this disadvantageously leads to large power consumption in the logic portion.

In particular, in a case where a MLS [multi line selection] drive system, in which a plurality of scan lines are selected at the same time, is adopted as a system for driving a liquid crystal display panel of a simple matrix type that is provided with liquid crystal cells each at different intersections of a plurality of signal lines (segment signal lines) and a plurality of scan lines (common signal lines) that are perpendicular to the signal lines, processing for generating a segment drive signal by the logic portion becomes complicated, and this inevitably requires large power consumption. Thus, in order to keep the power consumption of the logic portion within the permissible range, power consumption required for the above processing needs to be reduced as much as possible.

In addition, in a case where a ternary drive system is adopted as the drive system of the liquid crystal display panel, although the power consumption required for driving liquid crystal is reduced, it may adversely affect such characteristics as cross talk and flicker. Thus, there have been demands from users wanting to set arbitrarily whether to adopt the binary drive system or the ternary drive system, depending on the combination with the liquid crystal display panel.

In the conventional liquid crystal drive device, however, in order to meet the above demands, a function for generating both a binary signal and a ternary signal needs to be included in the logic portion, and this has been a factor that causes the circuit size of the logic portion to increase unnecessarily.

An object of the present invention is to provide a capacity load drive device that permits arbitrary setting of a drive system of a capacity load without increasing power consumption or a circuit size of a logic portion, and to provide a liquid crystal display device employing the capacity load drive device.

Means For Solving The Problem

To achieve the above object, according to the present invention, a capacity load drive device comprises: a logic portion generating a binary logic signal; and a driver portion determining, based on a predetermined mode switching signal, whether to generate a binary drive signal or a ternary drive signal from the logic signal and applying the binary or ternary drive signal generated based on the determination, to one end of a capacity load (a first configuration).

In the capacity load drive device with the above-described first configuration, preferably, the driver portion comprises: a delay circuit delaying the logic signal to generate a binary delay logic signal; a switch circuit selectively applying, to a capacity load, any one of: a first voltage that corresponds to a high level of the drive signal; a second voltage that corresponds to a low level of the drive signal; and a third voltage that corresponds to an intermediate level of the drive signal; and a selector circuit accepting input of the logic signal, the delay logic signal, and the mode switching signal to perform switching control of the switch circuit (a second configuration).

Alternatively, in the capacity load drive device with the above-described first configuration, preferably, the logic portion comprises a delay circuit delaying the logic signal to generate a binary delay logic signal, and the driver portion comprises: a switch circuit selectively applying, to the capacity load, any one of: a first voltage that corresponds to the high level of the drive signal; a second voltage that corresponds to the low level of the drive signal; and a third voltage that corresponds to the intermediate level of the drive signal; and a selector circuit accepting input of the logic signal, the delay logic signal, and the mode switching signal to perform switching control of the switch circuit (a third configuration).

In the capacity load drive device with the above-described second or third configuration, it is preferable that, when a ternary drive system is selected by the mode switching signal, the selector circuit perform switching control of the switch circuit such that: when both the logic signal and the delay logic signal are in first logic states, the first voltage is outputted as the drive signal; when both the logic signal and the delay logic signal are in second logic states, the second voltage is outputted as the drive signal; and when the logic signal and the delay logic signal are in different logic states, the third voltage is outputted as the drive signal, and that, when a binary drive system is selected by the mode switching signal, the selector circuit performs switching control of the switch circuit, without depending on the delay logic signal, such that: when the logic signal is in the first logic states, the first voltage is outputted as the drive signal; and when the logic signal is in the second logic states, the second voltage is outputted as the drive signal (a fourth configuration).

Preferably, to the capacity load drive device with any one of the above-described first to fourth configurations, a liquid crystal cell is connected as the capacity load (a fifth configuration).

A liquid crystal display device according to the invention comprises: a liquid crystal display panel that has, as the liquid crystal cell, a plurality of liquid crystal cells held between a plurality of scan lines and a plurality of signal lines; and the capacity load drive device according to claim 4 that drives the liquid crystal cells, and either the logic portion or the driver portion comprises a shift register that stores the logic signal, which is serially fed thereto, sequentially while shifting the logic signal bit by bit to output logic signals of a plurality of digits in parallel form (a sixth configuration).

In the liquid crystal display device with the above-described sixth configuration, preferably, the capacity load drive device selects, in vertical scanning of the liquid crystal display panel, a predetermined number of scan lines out of the plurality of scan lines at the same time (a seventh configuration).

Advantages Of The Invention

According to the present invention, it is possible to set arbitrarily a drive system of a capacity load without increasing power consumption or the circuit size of a logic portion.

LIST OF REFERENCE SYMBOLS

Figure 1:
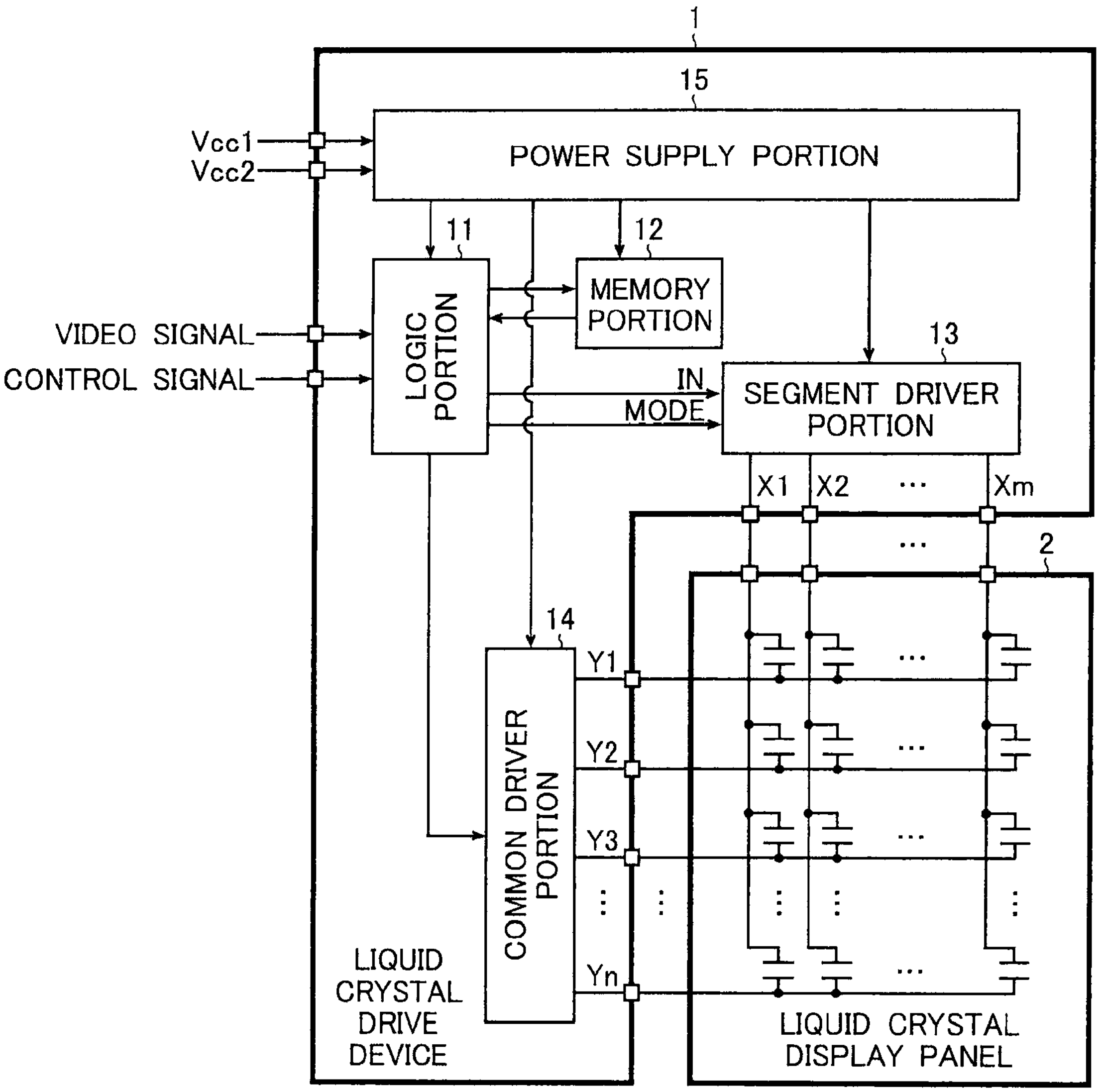
[FIG. 1] A block diagram showing an embodiment of a liquid crystal display device according to the present invention.

1 liquid crystal drive device (capacity load drive device)
11 logic portion
12 memory portion
13 segment driver portion
14 common driver portion
15 power supply portion
2 liquid crystal display panel
REG shift register circuit
DLY1, DLY2, . . . , DLYm delay circuit
SEL1, SEL2, . . . , SELm selector circuit
SW1, SW2, . . . , SWm switch circuit
S11, S12, . . . , S1m switch (for VH selection)
S21, S22, . . . , S2m switch (for VL selection)
S31, S32, . . . , S3m switch (for VC selection)

BEST MODE FOR CARRYING OUT THE INVENTION

Hereinafter, a detailed description will be given with a case taken up as an example, in which the present invention is applied to a liquid crystal display device.

FIG. 1 is a diagram showing an embodiment of a liquid crystal display device according to the present invention.

As shown in FIG. 1, the liquid crystal display device according to the embodiment has a liquid crystal drive device 1 and a liquid crystal display panel 2 which is a subject of the driving.

The liquid crystal drive device 1 is a capacity load drive device that drives liquid crystal cells in the liquid crystal display panel 2, and is a semiconductor device integrating a logic portion 11, a memory portion 12, a segment driver portion 13, a common driver portion 14, and a power supply portion 15.

The logic portion 11 is means for accepting input of a video signal and a control signal and feeding various signals (including a logic signal IN, a common selection signal, and other signals) required for controlling a liquid crystal display, to the segment driver portion 13 and to the common driver portion 14. In addition, the logic portion 11 has a data register, a command decoder, a MPU [micro processing unit] interface, a control register, an address counter, a timing generator etc. (none of which is illustrated).

The memory portion 12 is buffer means for temporarily storing the logic signal IN generated by the logic portion 11 and reading it out as necessary to send it to the segment driver portion 13.

The segment driver portion 13 is means for generating segment drive signals X1 to Xm according to the binary logic signal IN (and in turn, the video signal fed to the liquid crystal drive device 1 from outside) fed from the logic portion 11 and feeding those signals to different signal lines (different one ends of the liquid crystal cells) of the liquid crystal display panel 1. In particular, in the liquid crystal drive device 1 according to the embodiment, the segment driver portion 13 has a function that determines, based on a predetermined mode switching signal MODE whether to generate a binary segment drive signal or ternary segment drive signal from the logic signal IN, and that applies binary or ternary segment drive signals X1 to Xm that are generated based on the determination, to different signal lines of the liquid crystal display panel 1. The above-mentioned function of the segment driver portion 13 will be described later, together with the internal configuration of the segment driver portion 13.

The common driver portion 14 is means for generating common drive signals Y1 to Yn according to the common selection signal fed from the logic portion 11 and feeding those signals to different scan lines (different other ends of the liquid crystal cells) of the liquid crystal display panel 1. In the liquid crystal drive device 1 according to the embodiment, the common driver portion 14 adopts a MLS drive system in which, in vertical scanning of the liquid crystal display panel 1, scan lines of the liquid crystal display panel 1 are selected by a predetermined numbers at the same time. Compared with a configuration where an APT [Alt Pleshko technics] drive system is adopted in which each scan line is selected successively by time division, the configuration as described above makes it possible to cut down the number of the common selection signals to be generated by the logic portion 11, and in addition to alleviate frame response and reduce common voltage. However, in the case where the MLS drive system is adopted, processing for generating the logic signal IN (that is, the processing for generating the segment drive signals X1 to Xm) in the logic portion 11 is made complicated, and this inevitably requires large power consumption. Thus, in order to keep the power consumption of the logic portion 11 within the permissible range, power consumption required for the processing described above needs to be reduced as much as possible.

The power supply portion 15 is means for accepting input of a first supply voltage Vcc1 and a second supply voltage Vcc2 from outside the device and feeding drive voltages to the logic portion 11, the memory portion 12, the segment driver portion 13, and the common driver portion 14.

The liquid crystal display panel 2 is a liquid display panel of a simple matrix type (the STN [super twisted nematic] type) that has liquid crystal cells held at different intersections of a plurality of signal lines (segment signal lines) and a plurality of scan lines (common signal lines) perpendicular to the signal lines, and that displays desired letters or images by applying a voltage across each liquid crystal cell to thereby change the inclination of liquid crystal molecules so as to control the transmissivity of light.

Next, the internal configuration and the operation of the segment driver portion 13 will be described in detail.

Figures 2, 3:
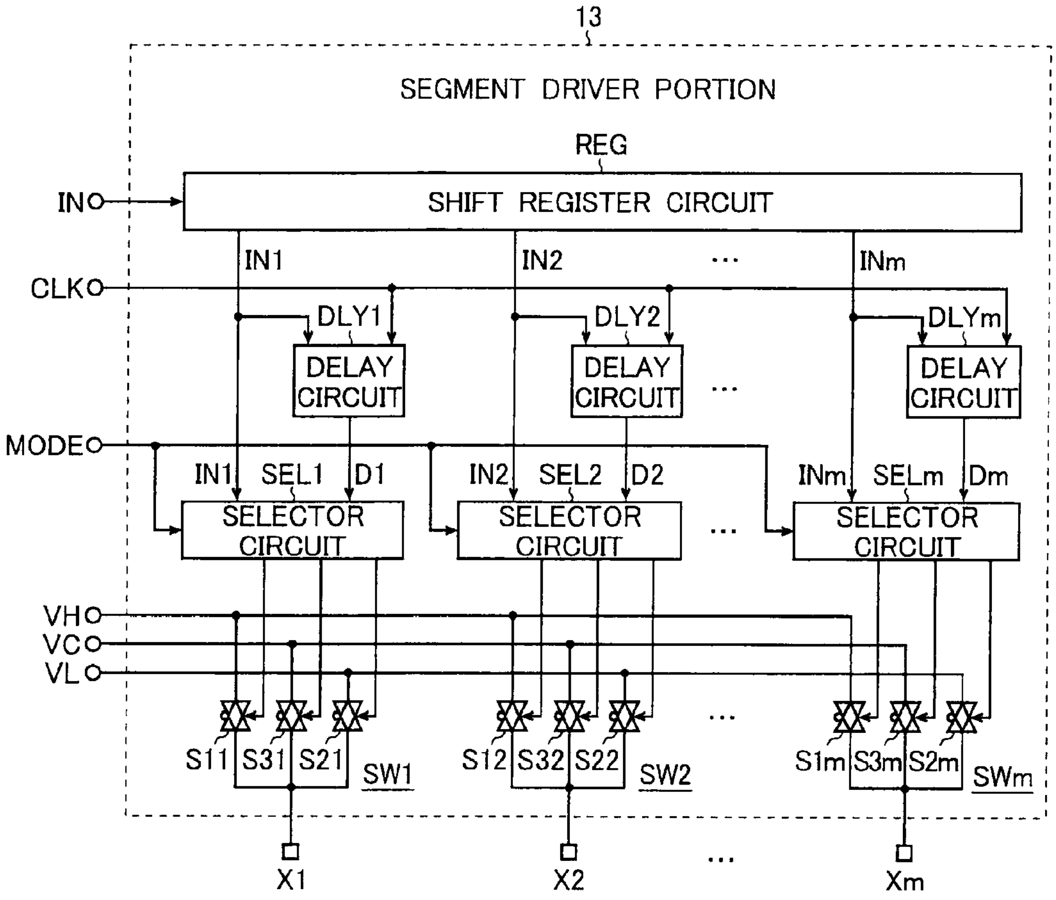
[FIG. 2] A block diagram showing an example of a configuration of a segment driver portion 13.
[FIG. 3] A logic value table illustrating the switching operation of a switch circuit SW1.

FIG. 2 is a block diagram showing an example of a configuration of the segment driver portion 13.

As shown in FIG. 2, the segment driver portion 13 of this configuration example has a shift-register circuit REG, delay circuits DLY1 to DLYm, selector circuits SEL1 to SELm, and switch circuits SW1 to SWm.

The shift-register circuit REG is means for storing the logic signal IN, which is serially fed thereto from the logic portion 11, sequentially while shifting it bit by bit to output logic signals N1 to INm of m digits in parallel form to succeeding stages, namely the delay circuits DLY1 to DLYm and the selector circuits SEL1 to SELm.

The delay circuits DLY1 to DLYm are means for delaying the logic signals IN1 to INm by a single clock of a clock signal CLK to generate binary delay logic signals D1 to Dm; for example, it is possible to use D flip-flops etc.

The selector circuits SEL1 to SELm are means for accepting input of the logic signals IN1 to INm, the delay logic signals D1 to Dm, and a mode switching signal MODE and performing switching control of the switch circuits SW1 to SWm. The switching operation of the switch circuits SW1 to SWm performed by the selector circuits SEL1 to SELm will be described later.

The switch circuits SW1 to SWm are means for selectively applying, to the liquid crystal cell, any one of: the first voltage VH that corresponds to a high level of the segment drive signals X1 to Xm; the second voltage VL that corresponds to a low level of the segment drive signals X1 to Xm; and the third voltage VC that corresponds to an intermediate level of the segment drive signals X1 to Xm. The respective switch circuits SW1 to SWm have switches S11, S12, . . . , and S1m for VH selection, switches S21, S22, . . . , and S2m for VL selection, and switches S31, S32, . . . , and S3m for VC selection.

The third voltage VC may have any potential level so long as it is one between the first voltage VH and the second voltage VL; desirably, the potential level (i.e., the midpoint potential) is so set, in particular, that the difference between it and the first voltage VH (VH-VC) equals the difference between it and the second voltage VL (VC-VL). Particularly, in the liquid crystal drive device 1 according to the embodiment, the third voltage VC is the ground potential, and the first voltage VH and the second voltage VL are positive and negative potentials, respectively, with equal absolute values.

Next, the switching operation of the switch circuits SW1 to SWm performed by the selector circuits SEL1 to SELm will be described in detail with reference to FIGS. 3 and 4.

FIG. 3 is a logic value table illustrating the switching operation of the switch circuit SW1 performed by the selector circuit SEL1, and shows, in order from left, the logic values (high level/low level) of the mode switching signal MODE, the logic signal IN1, and the delay logic signal D1, on/off states of the switches S11, S21, and S31, and different voltage levels (VH/VC/VL) of the segment drive signal X1.

Figure 4:
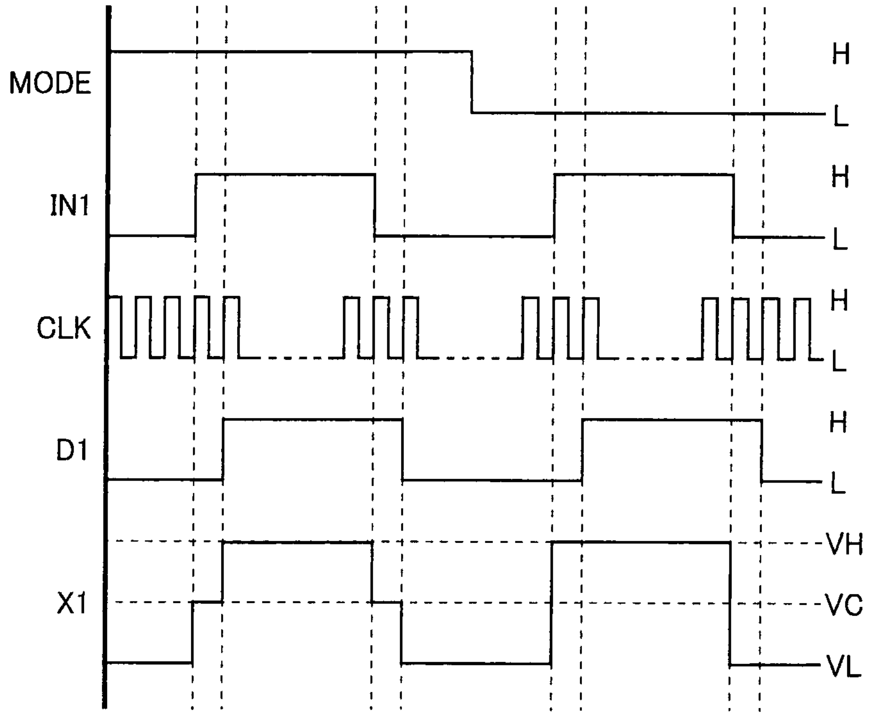
[FIG. 4] A waveform diagram illustrating the operation of generating a segment drive signal X1.

FIG. 4 is a waveform diagram illustrating the operation of generating the segment drive signal X1, and shows, in order from the top, the voltage waveforms of the mode switching signal MODE, the logic signal IN1, the clock signal CLK, the delay logic signal D1, and the segment drive signal X1.

In FIGS. 3 and 4, only how the segment drive signal X1 is generated by the switching operation of the switch circuit SW1 is taken up as an example, however, regarding the rest of the switch circuits SW2 to SWm, the segment drive signals X2 to Xm are generated by switching operation like that of the switch circuit SW1.

As shown in FIGS. 3 and 4, when a ternary drive system is selected by the mode switching signal MODE (when the mode switching signal MODE is at the high level), the selector circuit SEL1 performs switching control of the switch circuit SW1 such that: when both the logic signal IN1 and the delay logic signal D1 are at the high level, the first voltage VH is outputted as the segment drive signal X1; when both the logic signal IN1 and the delay logic signal D1 are at the low level, the second voltage VL is outputted as the segment drive signal X1; and when the logic signal N1 and the delay logic signal D1 are in different logic states, the third voltage VC is outputted as the segment drive signal X1.

On the other hand, when a binary drive system is selected by the mode switching signal MODE (when the mode switching signal MODE is at the low level), the selector SEL1 performs switching control of the switch circuit SW1, without depending on the delay logic signal D1, such that: when the logic signal IN1 is at the high level, the first voltage VH is outputted as the segment drive signal X1; and when the logic signal IN1 is at the low level, the second voltage VL is outputted as the segment drive signal X1.

As described above, with the liquid crystal drive device 1 according to the embodiment, whichever of the binary drive system and the ternary drive system is selected as the drive system for the segment drive signals X1 to Xm, the logic portion 11 has only to generate the binary logic signal IN always, and thus it is possible to set arbitrarily the drive system for the segment drive signals X1 to Xm without increasing power consumption or the circuit size of the logic portion 11.

Although the embodiment described above deals with an example in which the present invention is applied to a liquid crystal display device that drives a liquid crystal display panel of a simple matrix type, this is not meant to limit the subject to which the invention is applied; it is also possible to apply the invention to liquid crystal display devices that drive liquid crystal display panels of another type of course, and to capacity load drive devices in general that drive a capacity load.

It should be noted that, in the embodiment described above, many other modifications and variations are possible within the scope of the present invention.

For example, although the embodiment described above deals with an example of a liquid crystal drive device in which a MLS drive system is adopted, this is merely an example of a configuration in which power consumption of a logic portion 11 is to be reduced; thus, the subject to which the present invention is applied is not limited to this, and, as will be understood from the foregoing, it is possible to apply the invention to liquid crystal drive devices in which another drive system is adopted, and to other capacity load drive devices.

Moreover, although the embodiment described above deals with an example in which a mode switching signal MODE is fed from the logic portion 11 to a segment driver portion 13, this is not meant to limit the invention; the mode switching signal MODE may be fed from outside the device to the segment driver portion 13.

Figure 5:
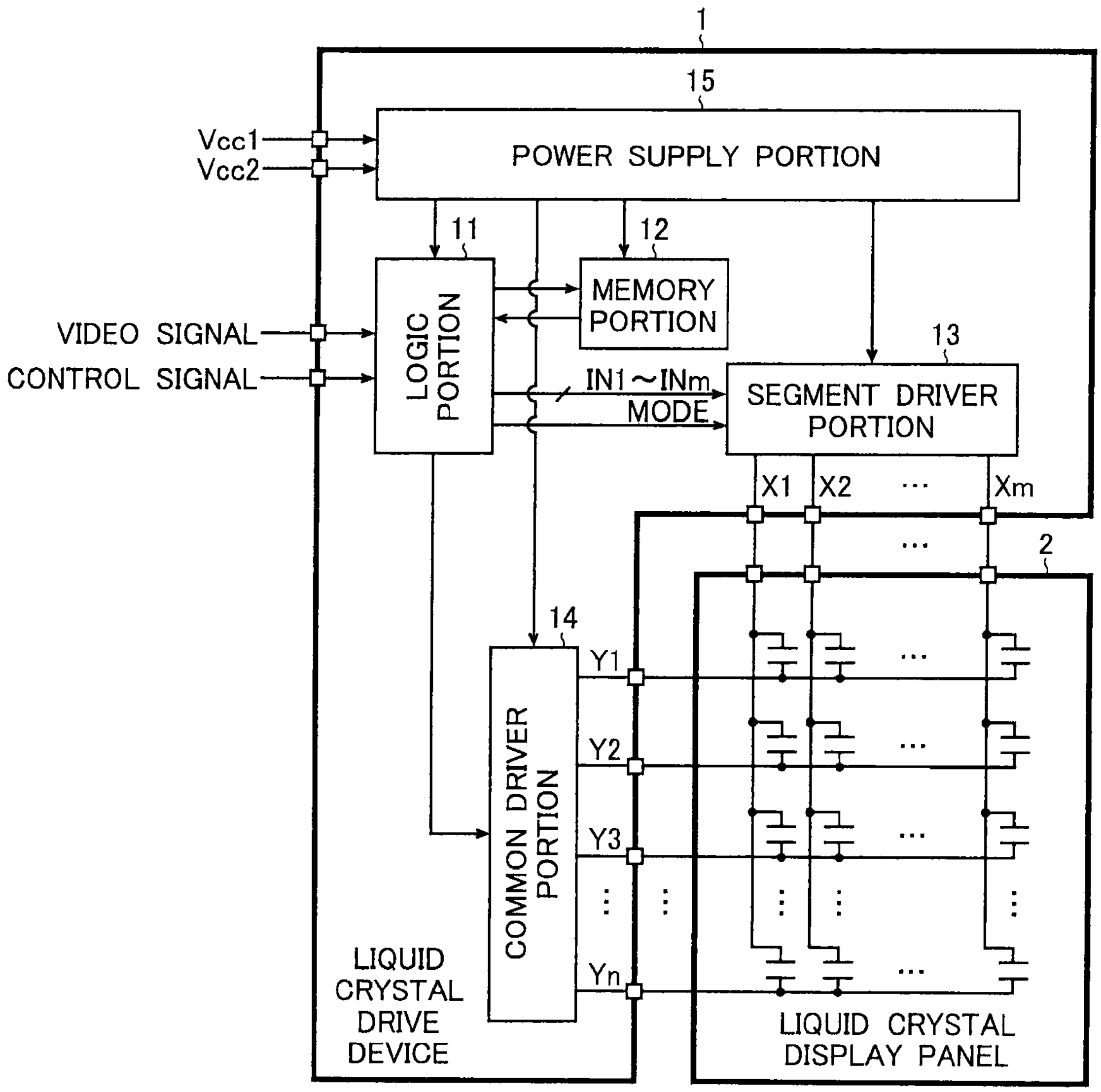
[FIG. 5] A block diagram showing a first modified example of the liquid crystal display device according to the invention.
Figure 6:
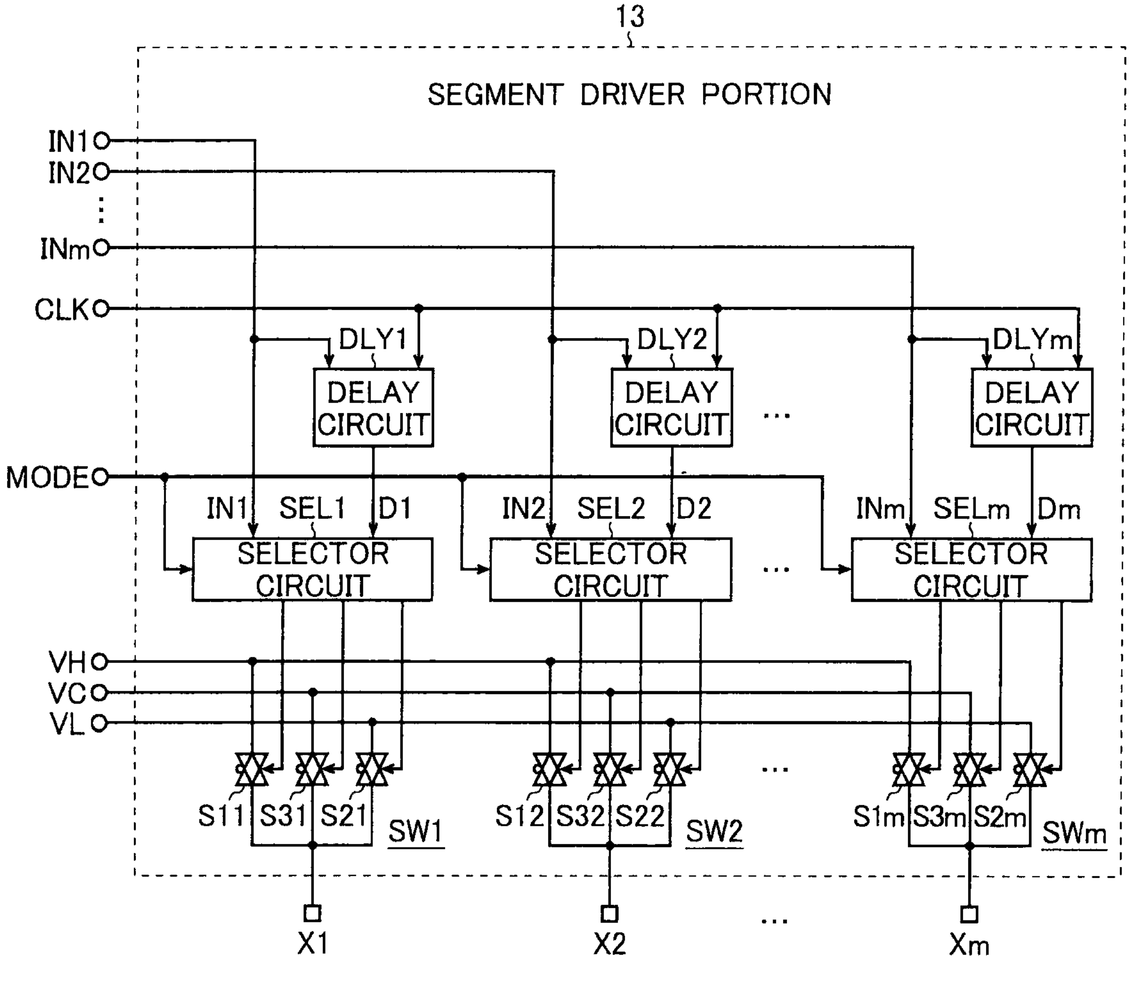
[FIG. 6] A block diagram showing a first modified example of the segment driver portion 13.

Moreover, although the embodiment described above deals with an example in which a shift register circuit REG is provided in the segment driver portion 13, this is not meant to limit the invention; as a first modified example shown in FIGS. 5 and 6, the shift register circuit may be included in the logic portion 11 so that logic signals IN1 to INm are fed from the logic portion 11 to the segment driver portion 13 in parallel form.

Figure 7:
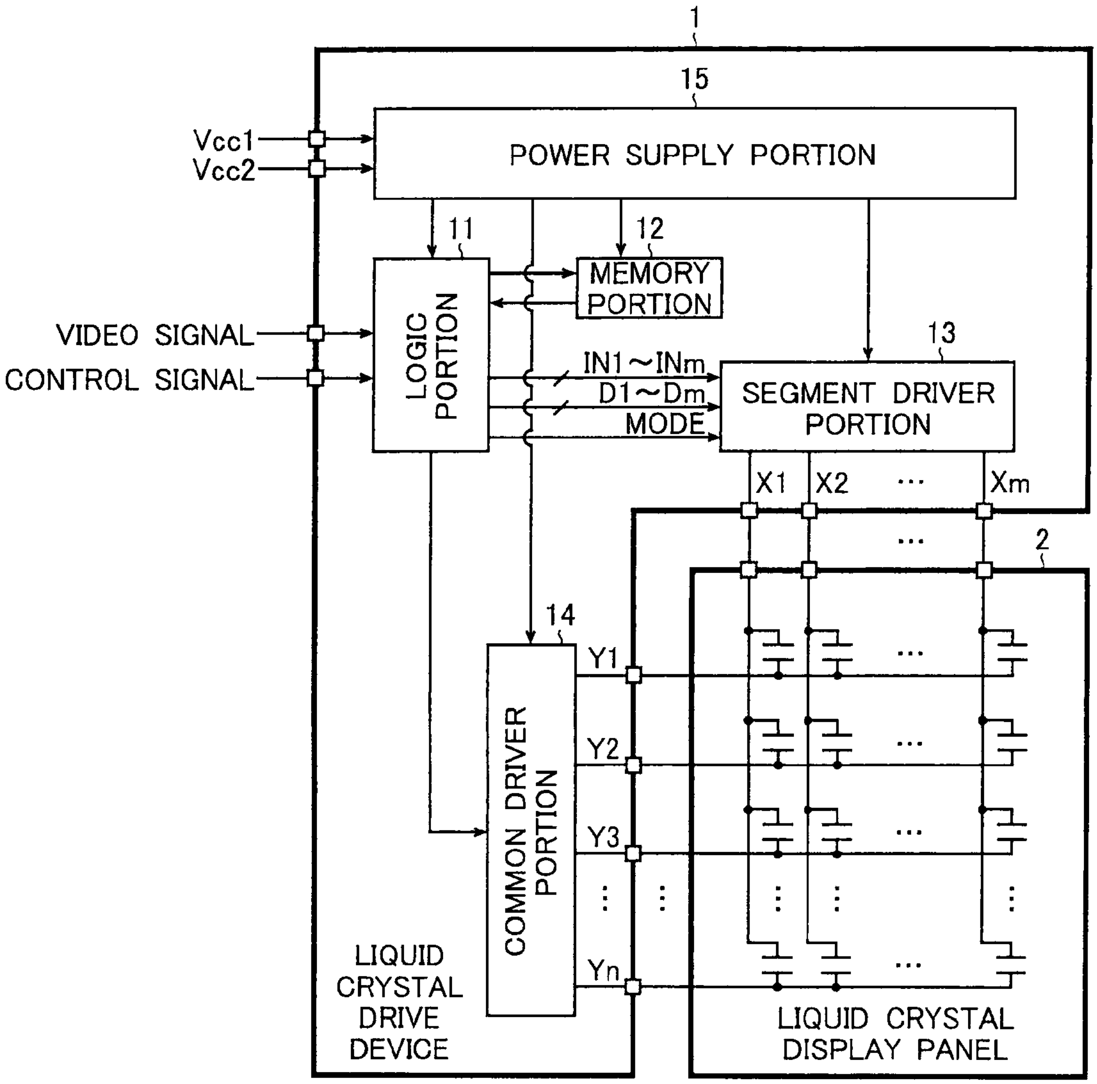
[FIG. 7] A block diagram showing a second modified example of the liquid crystal display device according to the invention.
Figure 8:
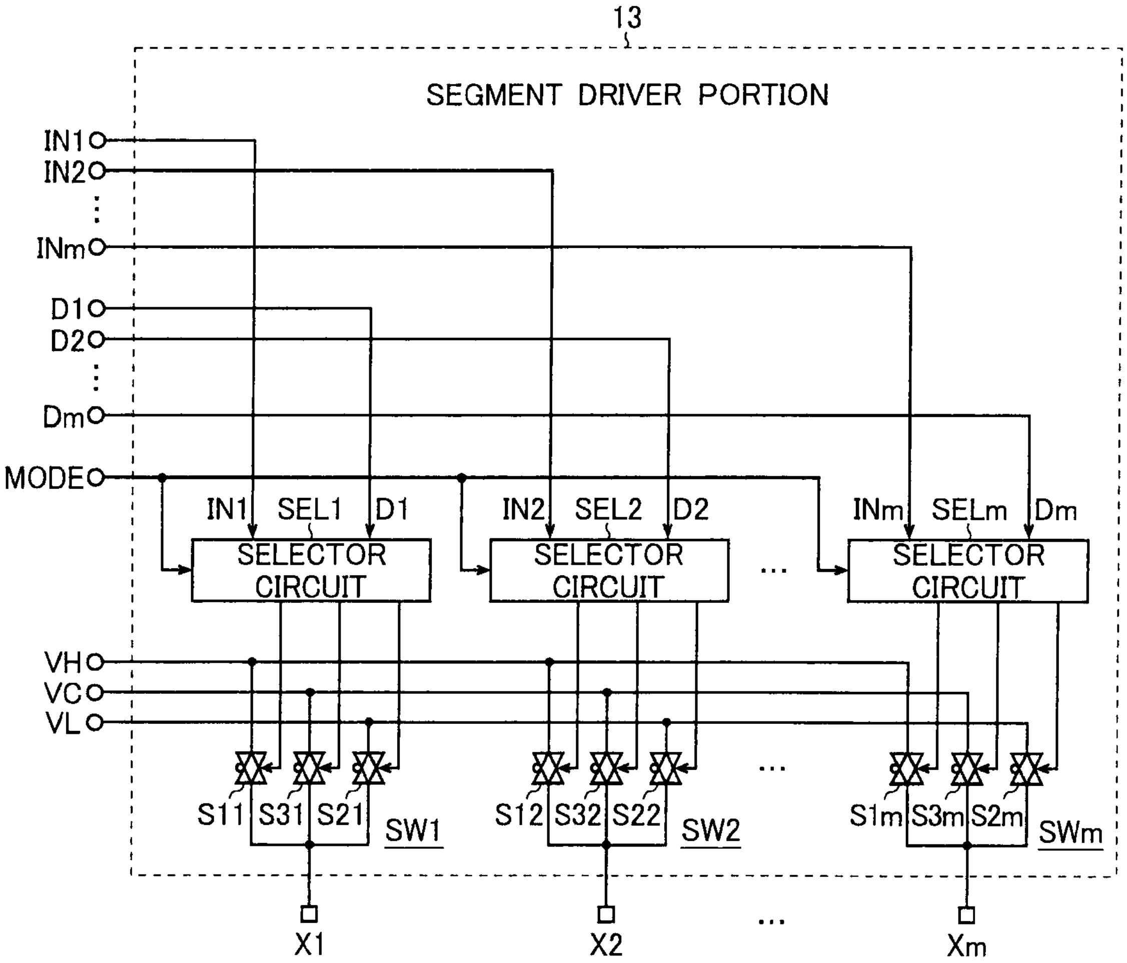
[FIG. 8] A block diagram showing a second modified example of the segment driver portion 13.
Figure 9A:
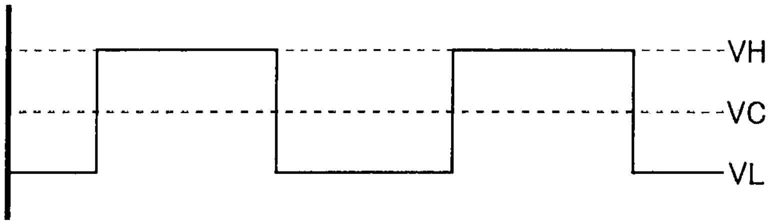
[FIG. 9A] A waveform diagram illustrating a binary drive system.
Figure 9B:
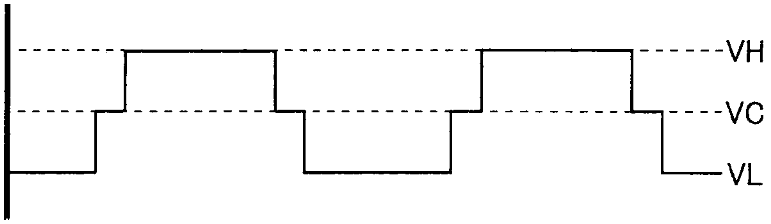
[FIG. 9B] A waveform diagram illustrating a ternary drive system.

Moreover, although the first modified example described above deals with an example in which delay circuits DLY1 to DLYm are provided in the segment driver portion 13, this is not meant to limit the invention; as a second modified example shown in FIGS. 7 and 8, the delay circuits may be included in the logic portion 11 so that the logic signals IN1 to INm and delay logic signals D1 to Dm are, respectively, fed from the logic portion 11 to the segment driver portion 13 in parallel form.

Industrial Applicability

The present invention offers a technology that is useful, for example, for achieving reduction in power consumption of liquid crystal display devices.

What is claimed is:

1. A capacity load drive device comprising:

a logic portion arranged to generate a binary logic signal; and a driver portion being fed with a drive voltage, the logic signal, a predetermined mode switching signal, and a clock signal, the driver portion determining, based on the mode switching signal, whether to generate a binary drive signal or a ternary drive signal from the logic signal and arranged to apply to one end of a capacity load the binary or ternary drive signal based on the determination, wherein the driver portion includes a delay circuit arranged to delay, in accordance with the clock signal, the logic signal to generate a binary delay logic signal, and wherein the driver portion generates the ternary drive signal based on the logic signal and the delay logic signal, and wherein the driver portion comprises:

a switch circuit arranged to apply selectively to a capacity load any one of: a first voltage that corresponds to a high level of the drive signal; a second voltage that corresponds to a low level of the drive signal; and a third voltage that corresponds to an intermediate level of the drive signal; and a selector circuit arranged to accept input of the logic signal, the delay logic signal, and the mode switching signal to perform switching control of the switch circuit, and the capacity load drive device is arranged such that:

when a ternary drive system is selected by the mode switching signal, the selector circuit performs switching control of the switch circuit such that: when both the logic signal and the delay logic signal are in first logic states, the first voltage is outputted as the drive signal; when both the logic signal and the delay logic signal are in second logic states, the second voltage is outputted as the drive signal; and when the logic signal and the delay logic signal are in different logic states, the third voltage is outputted as the drive signal, and when a binary drive system is selected by the mode switching signal, the selector circuit performs switching control of the switch circuit without depending on the logic state of the delay logic signal, such that: when the logic signal is in the first logic state, the first voltage is outputted as the drive signal; and when the logic signal is in the second logic state, the second voltage is outputted as the drive signal.

2. The capacity load drive device according to claim 1, wherein a liquid crystal cell is connected as the capacity load.

3. A liquid crystal display device comprising:

a liquid crystal display panel including a plurality of liquid crystal cells held between a plurality of scan lines and a plurality of signal lines, wherein the plurality of liquid crystal cells are connected as a capacity load; and a capacity load drive device arranged to drive the liquid crystal cells, wherein the capacity load device comprises:

a logic portion arranged to generate a binary logic signal; and a driver portion being fed with a drive voltage, the logic signal, a predetermined mode switching signal, and a clock signal, the driver portion determining, based on the mode switching signal, whether to generate a binary drive signal or a ternary drive signal from the logic signal and arranged to apply to one end of the capacity load the binary or ternary drive signal based on the determination, wherein either the logic portion or the driver portion comprises a shift register that is arranged to store the logic signal, which is serially fed thereto, sequentially while shifting the logic signal bit by bit to output logic signals of a plurality of digits in parallel form, and wherein the driver portion includes a delay circuit arranged to delay, in accordance with the clock signal, the logic signal to generate a binary delay logic signal, and wherein the driver portion generates the ternary drive signal based on the logic signal and the delay logic signal, and wherein the driver portion comprises:

a switch circuit arranged to apply selectively to a capacity load any one of: a first voltage that corresponds to a high level of the drive signal; a second voltage that corresponds to a low level of the drive signal; and a third voltage that corresponds to an intermediate level of the drive signal; and a selector circuit arranged to accept input of the logic signal, the delay logic signal, and the mode switching signal to perform switching control of the switch circuit, and the capacity load drive device is arranged such that:

when a ternary drive system is selected by the mode switching signal, the selector circuit performs switching control of the switch circuit such that: when both the logic signal and the delay logic signal are in first logic states, the first voltage is outputted as the drive signal; when both the logic signal and the delay logic signal are in second logic states, the second voltage is outputted as the drive signal; and when the logic signal and the delay logic signal are in different logic states, the third voltage is outputted as the drive signal, and when a binary drive system is selected by the mode switching signal, the selector circuit performs switching control of the switch circuit without depending on the logic state of the delay logic signal, such that: when the logic signal is in the first logic state, the first voltage is outputted as the drive signal; and when the logic signal is in the second logic state, the second voltage is outputted as the drive signal.

4. The liquid crystal display device according to claim 3 wherein the capacity load drive device is arranged to select, in vertical scanning of the liquid crystal display panel, a predetermined number of scan lines out of the plurality of scan lines at a same time.

5. The capacity load drive device according to claim 1 wherein the delay circuit delays the logic signal by a single clock of the clock signal to generate the delay logic signal.

* * * * *